US008068639B2

(12) United States Patent
Ishiwata et al.

(10) Patent No.: US 8,068,639 B2
(45) Date of Patent: Nov. 29, 2011

(54) IMAGE PICKUP APPARATUS, CONTROL METHOD THEREFOR, AND COMPUTER PROGRAM FOR DETECTING IMAGE BLUR ACCORDING TO MOVEMENT SPEED AND CHANGE IN SIZE OF FACE AREA

(75) Inventors: Hisashi Ishiwata, Kanagawa (JP); Yoshito Terashima, Tokyo (JP); Tetsuo Mise, Tokyo (JP); Ryuji Shibata, Kanagawa (JP); Masakazu Koyanagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1008 days.

(21) Appl. No.: 11/773,247

(22) Filed: Jul. 3, 2007

(65) Prior Publication Data

US 2008/0013851 A1 Jan. 17, 2008

(30) Foreign Application Priority Data

Jul. 13, 2006 (JP) .................. 2006-192417

(51) Int. Cl.
*G06K 9/40* (2006.01)
*G06K 9/00* (2006.01)
*G03B 17/00* (2006.01)

(52) U.S. Cl. .......................................... 382/103; 396/52

(58) Field of Classification Search ........................ None
See application file for complete search history.

(56) References Cited

U.S. PATENT DOCUMENTS

| 6,603,508 B1 * | 8/2003 | Hata .......................... 348/229.1 |
| RE38,361 E * | 12/2003 | Hamada et al. ................. 396/52 |
| 2004/0061796 A1* | 4/2004 | Honda et al. ................. 348/297 |

FOREIGN PATENT DOCUMENTS

| JP | 08-298616 | 11/1996 |
| JP | 2003-158646 | 5/2003 |
| JP | 2003-323621 | 11/2003 |
| JP | 2005-20196 | 1/2005 |
| JP | 2006-087083 | 3/2006 |
| JP | 2006-157428 | 6/2006 |
| JP | 2007-281536 | 10/2007 |

OTHER PUBLICATIONS

U.S. Appl. No. 12/334,715, filed Dec. 15, 2008, Mise, et al.
U.S. Appl. No. 12/358,917, filed Jan. 23, 2009, Mise, et al.
U.S. Appl. No. 11/760,436, filed Jun. 8, 2007, Ishiwata, et al.
U.S. Appl. No. 11/756,207, filed May 31, 2007, Mise et al.
U.S. Appl. No. 11/760,481, filed Jun. 8, 2007, Tereshima.
U.S. Appl. No. 13/025,226, filed Feb. 11, 2011, Mise, et al.

* cited by examiner

*Primary Examiner* — Tom Y Lu
*Assistant Examiner* — Thomas Conway
(74) *Attorney, Agent, or Firm* — Oblon, Spivak, McClelland, Maier & Neustadt, L.L.P.

(57) ABSTRACT

An image pickup apparatus includes: a face detection section configured to detect a face area from an image obtained by the image pickup apparatus; and a control section configured to detect at least any one of the amount of change in size of the face area detected by the face detection section and a movement speed of the face area, determine whether there is a possibility of occurrence of subject shake blur, which is blur occurring in a captured image due to the movement of a subject, on the basis of information on the detected amount of change in size of the face area or the detected movement speed of the face area, and output a warning when it is determined that there is a possibility of occurrence of subject shake blur.

20 Claims, 10 Drawing Sheets

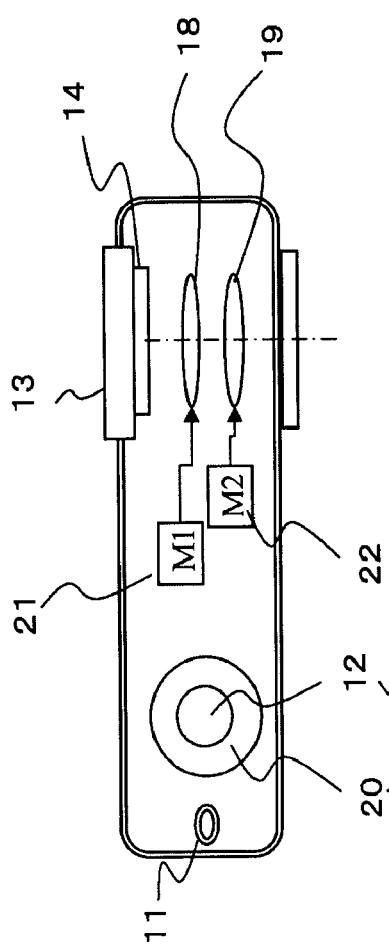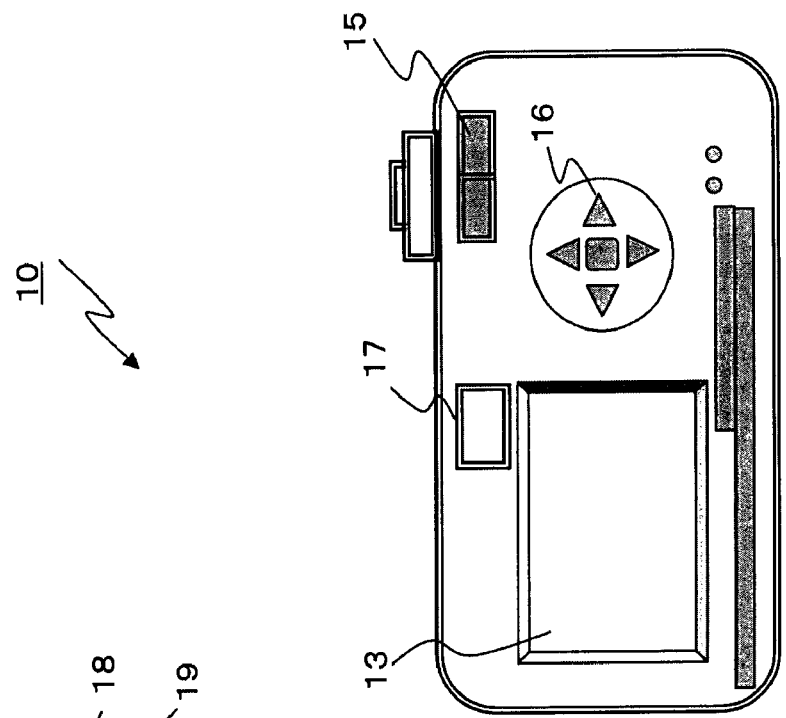

FIG. 7

| TIME | SUBJECT POSITION [CENTER OF SUBJECT (x,y)] | SUBJECT SIZE [X × Y (pixel)] |
|---|---|---|
| t0 | (235, 325) | 185 × 210 |
| t1 | (233, 324) | 184 × 208 |
| t2 | (220, 320) | 180 × 205 |
| .. | .. | .. |
| tn | (180, 280) | 150 × 180 |

FIG. 8
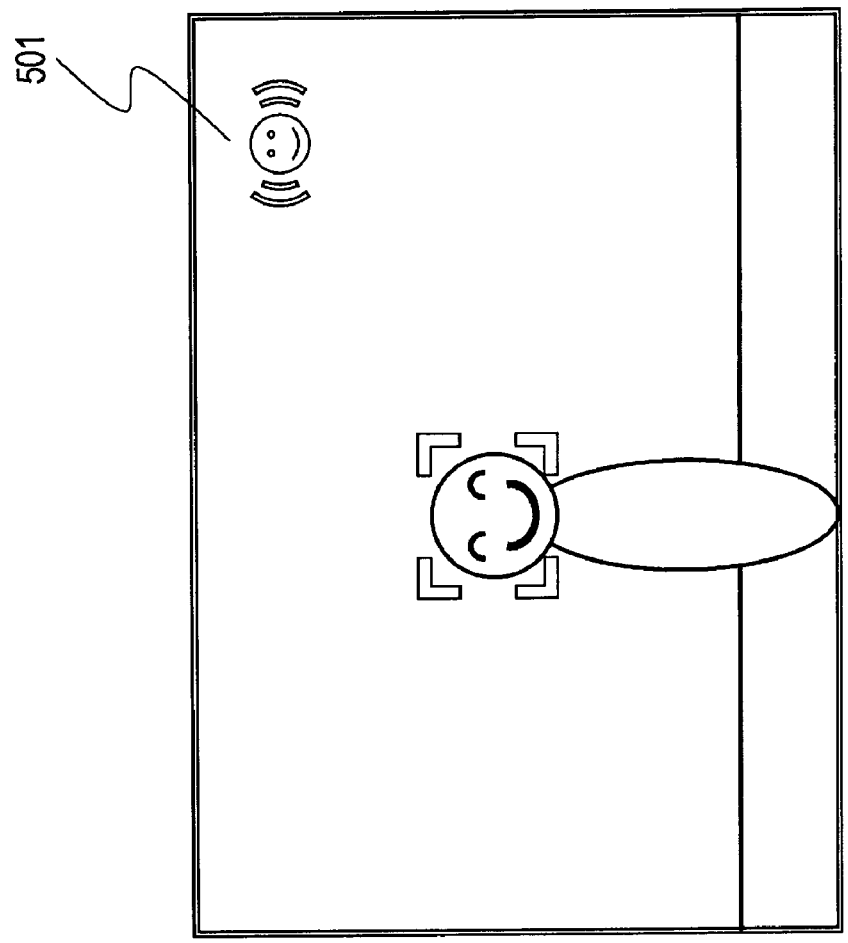
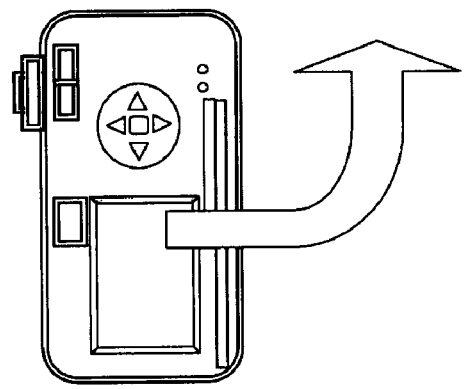

FIG. 9
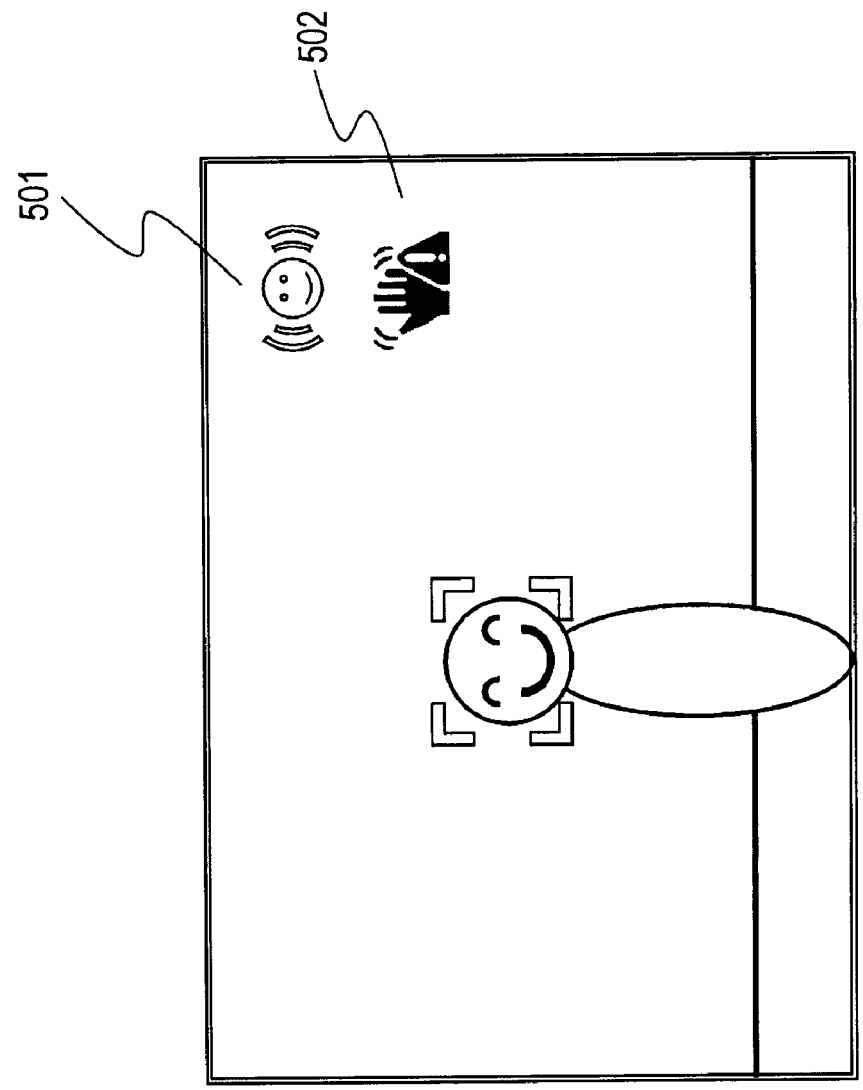
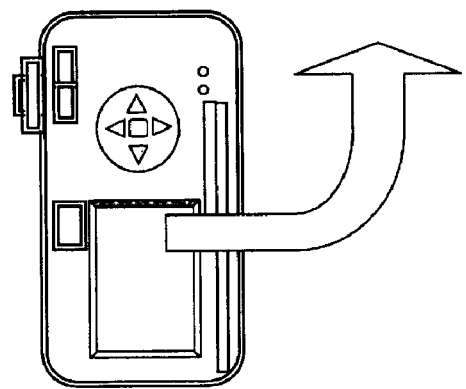

IMAGE PICKUP APPARATUS, CONTROL METHOD THEREFOR, AND COMPUTER PROGRAM FOR DETECTING IMAGE BLUR ACCORDING TO MOVEMENT SPEED AND CHANGE IN SIZE OF FACE AREA

CROSS REFERENCES TO RELATED APPLICATIONS

The present invention contains subject matter related to Japanese Patent Application JP 2006-192417 filed in the Japanese Patent Office on Jul. 13, 2006, the entire contents of which are incorporated herein by reference.

BACKGROUND OF THE INVENTION

1. Field of the Invention

The present invention relates to image pickup apparatuses, control methods therefor, and computer programs, and, more particularly, to an image pickup apparatus capable of detecting blur caused by the movement of a subject and preventing a blurred image from being captured, a control method therefor, and a computer program.

2. Description of the Related Art

Image pickup apparatuses such as digital cameras sometimes provide blurred photographs. Currently, various functions of preventing blurred photographs from being captured are implemented in cameras. For example, there is a function of displaying a "blur warning icon" on the display of a camera when an image capturing mode in which image capturing is performed at a shutter speed slower than a predetermined speed is set. This function is used to notify a user (photographer) that there is a possibility that blur caused by a camera shake will occur at a slow shutter speed.

Furthermore, some cameras include a gyro sensor, and have a function of causing the gyro sensor to detect the movement of a camera body held by a user (photographer) and displaying a "blur warning icon" on the display of the camera on the basis of the detection result. Thus, many techniques for detecting blur caused by the movement of a camera body and outputting a warning on the basis of the detection result have already been developed and are now being used.

However, there are two main factors responsible for the occurrence of blur in a photograph captured by a camera, that is, the above-described camera shake caused by the movement of a camera and subject shake. The camera shake occurs due to the movement of a camera body during exposure. The subject shake occurs due to the movement of a subject during exposure. Many techniques for detecting the camera shake that occurs due to the movement of a camera body and outputting a warning on the basis of the detection result have already been proposed.

On the other hand, a technique for detecting the subject shake that occurs due to the movement of a subject and outputting a warning for a user (photographer) on the basis of the detection result has not been disclosed. As a similar technique, for example, Japanese Unexamined Patent Application Publication No. 2003-323621 discloses a technique for detecting whether a person set as a subject goes out of an image capturing field and outputting a warning on the basis of the detection result. In addition, Japanese Unexamined Patent Application Publication No. 2005-20196 discloses a technique for analyzing captured images, extracting an image in which face images are overlapped or a face image is cut, and deleting the extracted image as an error photograph.

However, the above-described known techniques do not detect subject movement and warn a user of the occurrence of blur on the basis of the detection result.

SUMMARY OF THE INVENTION

It is desirable to provide an image pickup apparatus capable of determining whether there is a possibility that blur will occur in a captured image due to the movement of a target subject, and outputting a warning for a user if there is a possibility of occurrence of blur, a control method therefor, and a computer program.

An image pickup apparatus according to an embodiment of the present invention includes: a face detection section configured to detect a face area from an image obtained by the image pickup apparatus; and a control section configured to detect at least any one of the amount of change in size of the face area detected by the face detection section and a movement speed of the face area, determine whether there is a possibility of occurrence of subject shake blur that is blur occurring in a captured image due to the movement of a subject on the basis of information on the detected amount of change in size of the face area or the detected movement speed of the face area, and output a warning when it is determined that there is a possibility of occurrence of subject shake blur.

In the image pickup apparatus according to an embodiment of the present invention, the control section includes: a subject history information acquisition unit configured to continuously receive face area detection results from the face detection section, detect at least any one of the sizes and positions of face areas that are included in the continuously received face area detection results, generate history information using a plurality of pieces of information on the detected sizes or positions of the face areas, and record the generated history information in a storage section; a subject size change amount calculation unit configured to calculate the amount of change in size of the face area on the basis of the history information; and a subject movement speed calculation unit configured to calculate the movement speed of the face area on the basis of the history information. Furthermore, the control section determines whether there is a possibility of occurrence of subject shake blur on the basis of any one of the amount of change in size of the face area calculated by the subject size change amount calculation unit and the movement speed of the face area calculated by the subject movement speed calculation unit.

In the image pickup apparatus according to an embodiment of the present invention, the control section compares a product [ΔF·S] of the amount of change [ΔF] in size of the face area detected by the face detection section and a shutter speed [S] set for the image pickup apparatus with a predetermined threshold value, and determines that there is a possibility of occurrence of subject shake blur when the product [ΔF·S] is larger than the predetermined threshold value.

In the image pickup apparatus according to an embodiment of the present invention, the control section compares a product [V·S] of the movement speed [V] of the face area detected by the face detection section and the shutter speed [S] set for the image pickup apparatus with a predetermined threshold value, and determines that there is a possibility of occurrence of subject shake blur when the product [V·S] is larger than the predetermined threshold value.

In the image pickup apparatus according to an embodiment of the present invention, the control section outputs a warning icon to a display section of the image pickup apparatus when it is determined that there is a possibility of occurrence of subject shake blur.

In the image pickup apparatus according to an embodiment of the present invention, the warning icon output from the control section is a subject shake blur warning icon whose display information is different from that of a warning icon for a camera shake blur caused by the movement of a camera.

In the image pickup apparatus according to an embodiment of the present invention, the control section performs control processing for forbidding the image pickup apparatus to perform image capturing when it is determined that there is a possibility of occurrence of subject shake blur.

In the image pickup apparatus according to an embodiment of the present invention, the control section performs control processing for changing a shutter speed set for the image pickup apparatus to a high shutter speed when it is determined that there is a possibility of occurrence of subject shake blur.

In the image pickup apparatus according to an embodiment of the present invention, the control section performs control processing for increasing an ISO speed at the time of image capturing performed by the image pickup apparatus when it is determined that there is a possibility of occurrence of subject shake blur.

An image pickup apparatus control method according to an embodiment of the present invention is a method of performing blur detection processing in an image pickup apparatus. The image pickup apparatus control method includes: a face detecting step of detecting a face area from an image obtained by the image pickup apparatus; and a controlling step of detecting at least any one of the amount of change in size of the face area detected in the face detecting step and a movement speed of the face area, determining whether there is a possibility of occurrence of subject shake blur that is blur occurring in a captured image due to the movement of a subject on the basis of information on the detected amount of change in size of the face area or the detected movement speed of the face area, and outputting a warning when it is determined that there is a possibility of occurrence of subject shake blur.

In the image pickup apparatus control method according to an embodiment of the present invention, the controlling step includes: a subject history information acquiring step of continuously receiving face area detection results obtained in the face detecting step, detecting at least any one of the sizes and positions of face areas that are included in the continuously received face area detection results, generating history information using a plurality of pieces of information on the detected sizes or positions of the face areas, and recording the generated history information in a storage section; a subject size change amount calculating step of calculating the amount of change in size of the face area on the basis of the history information; and a subject movement speed calculating step of calculating the movement speed of the face area on the basis of the history information. Furthermore, in the controlling step, it is determined whether there is a possibility of occurrence of subject shake blur on the basis of any one of the amount of change in size of the face area calculated in the subject size change amount calculating step and the movement speed of the face area calculated in the subject movement speed calculating step.

In the image pickup apparatus control method according to an embodiment of the present invention, in the controlling step, a product $[\Delta F \cdot S]$ of the amount of change $[\Delta F]$ in size of the face area detected in the face detecting step and a shutter speed $[S]$ set for the image pickup apparatus is compared with a predetermined threshold value, and it is determined that there is a possibility of occurrence of subject shake blur when the product $[\Delta F \cdot S]$ is larger than the predetermined threshold value.

In the image pickup apparatus control method according to an embodiment of the present invention, in the controlling step, a product $[V \cdot S]$ of the movement speed $[V]$ of the face area detected in the face detecting step and the shutter speed $[S]$ set for the image pickup apparatus is compared with a predetermined threshold value, and it is determined that there is a possibility of occurrence of subject shake blur when the product $[V \cdot S]$ is larger than the predetermined threshold value.

In the image pickup apparatus control method according to an embodiment of the present invention, the controlling step includes a step of outputting a warning icon to a display section of the image pickup apparatus when it is determined that there is a possibility of occurrence of subject shake blur.

In the image pickup apparatus control method according to an embodiment of the present invention, the warning icon is a subject shake blur warning icon whose display information is different from that of a warning icon for a camera shake blur caused by the movement of a camera.

In the image pickup apparatus control method according to an embodiment of the present invention, the controlling step includes a step of performing control processing for forbidding the image pickup apparatus to perform image capturing when it is determined that there is a possibility of occurrence of subject shake blur.

In the image pickup apparatus control method according to an embodiment of the present invention, the controlling step includes a step of performing control processing for changing a shutter speed set for the image pickup apparatus to a high shutter speed when it is determined that there is a possibility of occurrence of subject shake blur.

In the image pickup apparatus control method according to an embodiment of the present invention, the controlling step includes a step of performing control processing for increasing an ISO speed at the time of image capturing performed by the image pickup apparatus when it is determined that there is a possibility of occurrence of subject shake blur.

A computer program according to an embodiment of the present invention causes a computer to perform blur detection processing in an image pickup apparatus. The computer program causes the computer to execute: a face detecting step of detecting a face area from an image obtained by the image pickup apparatus; and a controlling step of detecting at least any one of the amount of change in size of the face area detected in the face detecting step and a movement speed of the face area, determining whether there is a possibility of occurrence of subject shake blur that is blur occurring in a captured image due to the movement of a subject on the basis of information on the detected amount of change in size of the face area or the detected movement speed of the face area, and outputting a warning when it is determined that there is a possibility of occurrence of subject shake blur.

Here, a computer program according to an embodiment of the present invention can be provided to, for example, a versatile computer system capable of executing various program codes via a computer-readable storage medium such as a CD, an FD, or an MO, or a communication medium such as a network. By providing such a program to the computer system in a computer-readable format, processing corresponding to the program is performed in the computer system.

Other objects, characteristics, and advantages of the present invention will become apparent from more detailed descriptions based on the following embodiments of the present invention and the accompanying drawings. In this specification, a system means a logical group of a plurality of apparatuses. These apparatuses may not be in the same cabinet.

According to an embodiment of the present invention, a face area is detected from data of an image obtained by an image pickup apparatus. The amount of change in size of the detected face area or the movement speed of the detected face area is calculated. It is determined whether there is a possibility of occurrence of subject shake blur, which is caused by the movement of a subject, on the basis of the calculation result and a shutter speed. Furthermore, if it is determined that there is a possibility of occurrence of subject shake blur, for example, the display of a warning icon on a monitor, control processing for forbidding image capturing, the automatic adjustment of a shutter speed, or processing for controlling an ISO speed is performed. Accordingly, a user (photographer) can perform appropriate processing so as to prevent a blurred image from being captured. Consequently, an unblurred image can be captured.

BRIEF DESCRIPTION OF THE DRAWINGS

FIGS. 2A to 2C are diagrams describing an exemplary external configuration of an image pickup apparatus according to an embodiment of the present invention;

FIG. 7 is a diagram describing exemplary pieces of data included in subject history information;

FIG. 8 is a diagram describing a display example of a subject shake blur warning icon;

FIG. 9 is a diagram describing a display example of the subject shake blur warning icon and a camera shake blur warning icon.

DESCRIPTION OF THE PREFERRED EMBODIMENTS

Figure 1:
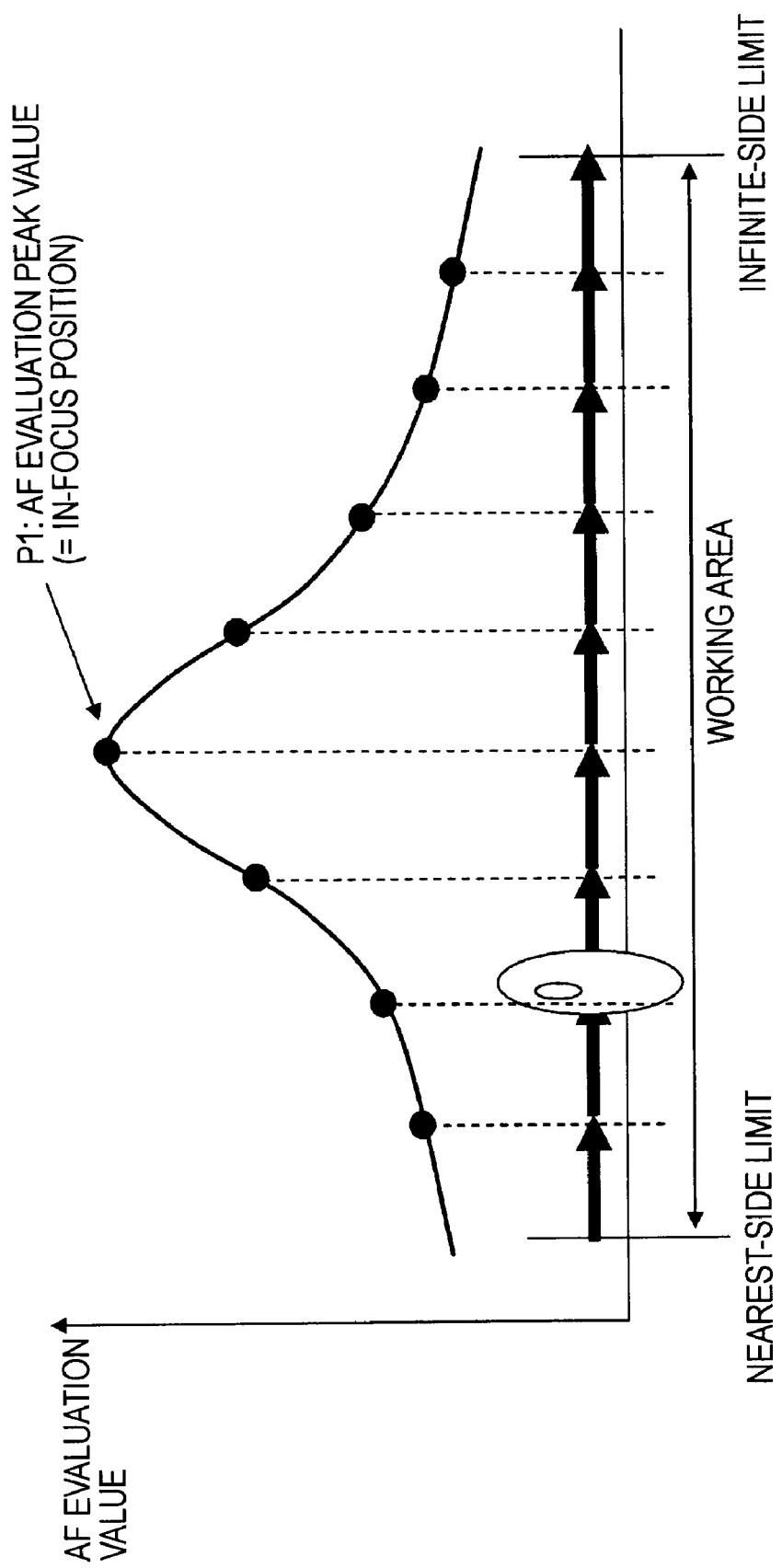
FIG. 1 is a diagram describing lens driving processing performed as a focusing operation in focus control and exemplary AF evaluation value acquisition processing.

In the following, an image pickup apparatus according to an embodiment of the present invention, a control method therefor, and a computer program will be described in detail with reference to the accompanying drawings.

In the present invention, it is determined whether there is a possibility that blur will occur in a captured image due to the movement of a target subject. If it is determined that there is a possibility of occurrence of blur, a warning is output for a user. In this description, blur that may occur in a captured image due to subject movement is referred to as "subject shake blur", and blur that may occur in a captured image due to camera movement is referred to as "camera shake blur".

An image pickup apparatus according to an embodiment of the present invention detects the subject shake blur and outputs a warning on the basis of the detection result so as to prevent a blurred image from being captured. More specifically, an image pickup apparatus according to an embodiment of the present invention detects the subject shake blur on the basis of the face image of a person that is a target subject.

The summary of processing performed by an image pickup apparatus according to an embodiment of the present invention will be described. First, an image pickup apparatus according to an embodiment of the present invention such as a digital camera analyzes image data to be captured such as a camera-through image including images continuously obtained thereby so as to identify a face area of a subject, detects the change in size or position of the identified face area, and determines whether there is a possibility of occurrence of the subject shake blur on the basis of the detection result. If there is a possibility of occurrence of the subject shake blur, the image pickup apparatus displays a warning icon (subject shake blur warning icon) on a display thereof on which the camera-through image is displayed so as to notify a user of a possibility of occurrence of the subject shake blur.

The subject shake blur detection processing and the subject shake blur warning processing based on the detection result, which are performed by an image pickup apparatus according to an embodiment of the present invention, can be independently performed. For example, however, they may be performed concurrently with automatic focusing performed by the image pickup apparatus. That is, the distance from the image pickup apparatus to the face area of a subject detected in the subject shake blur detection processing is calculated, and the calculation result can be used as control information for automatic focusing. The assignee of the present invention has already filed a Japanese patent application regarding such an automatic focusing control technique.

Many image pickup apparatuses have an automatic focusing function in which focusing control is automatically performed on an image to be captured. As a representative focusing control method, a method of determining the contrast of an obtained image is known. In this method, it is determined whether the contrast of image data obtained via a lens is high or low.

More specifically, a high-frequency component in a specified area is extracted, the integral data of the extracted high-frequency component is generated, and then it is determined whether the contrast of the obtained image data is high or low on the basis of the generated integral data of the high-frequency component. That is, a plurality of images are obtained by moving a focus lens to a plurality of positions. Subsequently, filtering processing is performed upon luminance signals of the obtained images using, for example, a high pass filter so as to obtain AF evaluation values each denoting the contrast intensity of each of the obtained images. At that time, if there is a subject which is in focus at a certain focus lens position, the AF evaluation value with respect to a focus lens position is described by a curve shown in FIG. 1. A peak position P1 on this curve, that is, a position at which the image contrast value becomes the maximum value, is an in-focus position. In this method, a distance measuring optical system is not required to be disposed in addition to the image pickup optical system since focusing can be performed on the basis of only information on an image obtained by an imager that is an image pickup device for a digital camera. Accordingly, currently, this method is widely used in digital still cameras.

This automatic focusing control can be more accurately performed by calculating a distance between an image pickup apparatus and a face area that is detected as a subject and determining the contrast intensity using information on the calculated distance.

Furthermore, in an image pickup apparatus according to an embodiment of the present invention, the possibility of occurrence of the subject shake blur is determined on the basis of the change in size or position of a face area which is detected from obtained images. If it is determined that the possibility of occurrence of the subject shake blur is high, a warning is output. For example, a warning icon (subject shake blur warning icon) is displayed on a display on which a through image is displayed so as to notify a user of a possibility of occurrence of the subject shake blur. The user checks the warning and can perform appropriate processing so as to prevent a blurred image from being captured.

The configuration of an image pickup apparatus according to an embodiment of the present invention will be described with reference to FIG. 2A to FIG. 10. FIGS. 2A, 2B, and 2C are external views of an image pickup apparatus 10 according to an embodiment of the present invention. FIG. 2A is a top view of the image pickup apparatus 10. FIG. 2B is a front view of the image pickup apparatus 10. FIG. 2C is a rear view of the image pickup apparatus 10. FIG. 2A includes cross-section views of lens portions. The image pickup apparatus 10 is provided with the following components: a power switch 11; a release switch 12 that functions as a trigger unit used to set an image capturing timing, that is, functions as a shutter; a monitor 13 that displays an image (camera-through image) captured by the image pickup apparatus and operational information; an imager 14 that is an image pickup device (CCD); a zoom button 15 that allows a user to perform zoom control; an operation button 16 that allows a user to input various pieces of operational information; a viewfinder 17 that allows a user to check an image (camera-through image) captured by the image pickup apparatus; a focus lens 18 that is driven for focus control; a zoom lens 19 that is driven for zoom control; a mode dial 20 that allows a user to set an image capturing mode; a focus lens motor (M1) 21 that drives the focus lens 18; and a zoom lens motor (M2) 22 that drives the zoom lens 19.

One of a plurality of modes that can be set for an image pickup apparatus according to an embodiment of the present invention is a face recognition image capturing mode. If the mode dial 20 is moved to a setting position for the face recognition image capturing mode, the mode is set in the image pickup apparatus and the face image of a subject is recognized from images (a camera-through image) captured by the image pickup apparatus.

Furthermore, the change in size or position of the recognized face images is detected. It is determined whether there is a possibility of occurrence of the subject shake blur on the basis of the detection result. If it is determined that there is a possibility of occurrence of the subject shake blur, processing for notifying a user (photographer) of a possibility of occurrence of the subject shake blur is performed. More specifically, a warning icon representing that there is a possibility that the subject shake blur will occur is displayed on the monitor 13 or the viewfinder 17. Alternatively, an audible alert is output by, for example, a beeper.

Subject images are displayed on the viewfinder 17 and the monitor 13. The viewfinder 17 and the monitor 13 are configured with, for example, an LCD, and display subject images obtained via a lens as a moving image. This moving image is called a camera-through image. A user checks a target subject to be captured included in the camera-through image displayed on the viewfinder 17 or monitor 13, and presses the release switch 12 that functions as a shutter so as to record the image of the target subject.

Figure 3:
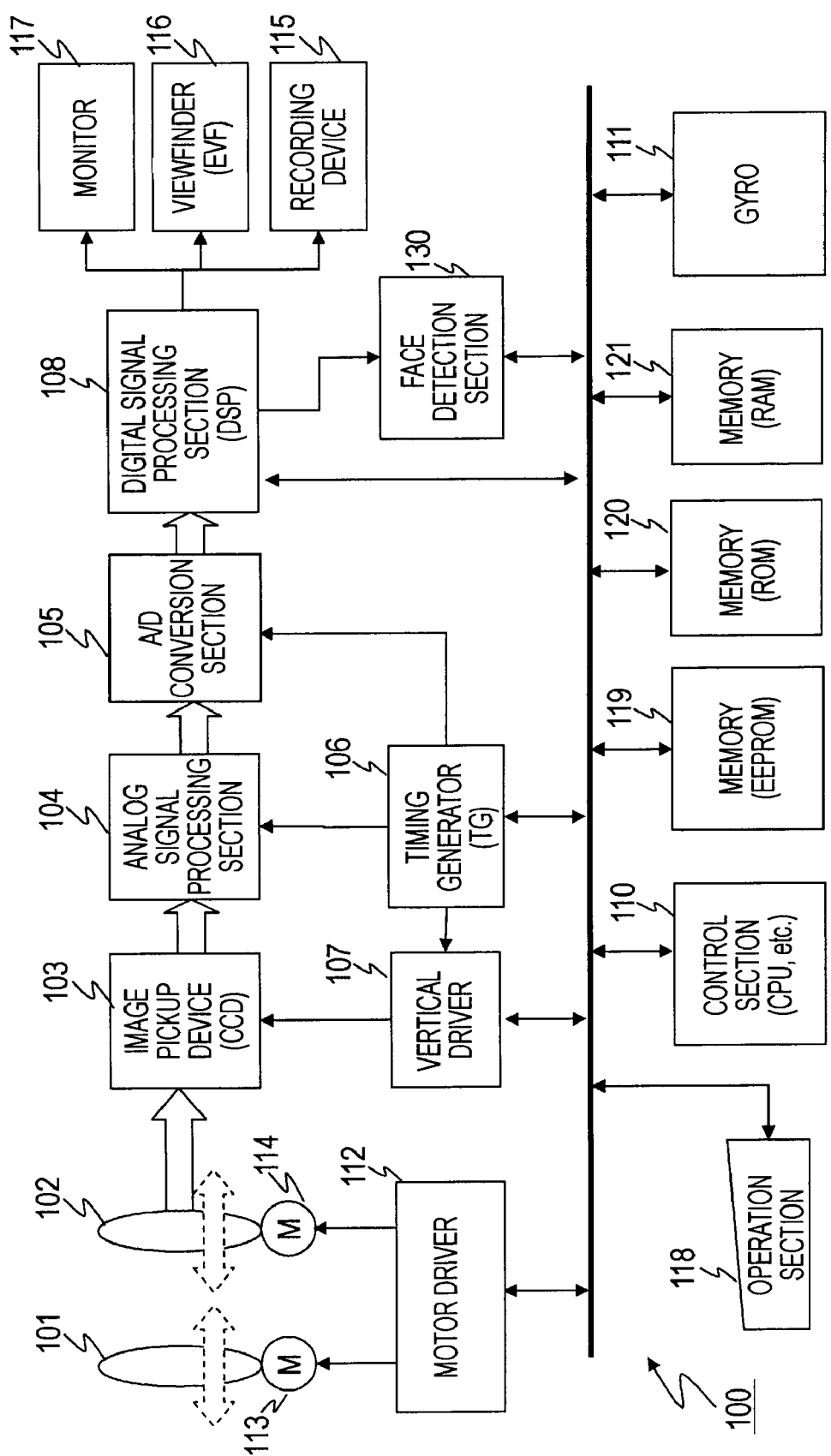
FIG. 3 is a diagram describing an exemplary hardware configuration of an image pickup apparatus according to an embodiment of the present invention.

The internal configuration of an image pickup apparatus 100 will be described with reference to FIG. 3. Light received by a focus lens 101 and a zoom lens 102 is input into an image pickup device 103 such as a CCD (Charge Coupled Device) and is then photoelectrically converted therein. The photoelectric conversion data is input into an analog signal processing section 104 and is then subjected to processing such as denoising therein. The processed signal is input into an A/D conversion section 105 and is then converted into a digital signal therein. Data obtained by the analog-to-digital conversion performed by the A/D conversion section 105 is recorded in a recording device 115 such as a flash memory. Furthermore, the obtained data is displayed on a monitor 117 and a viewfinder 116. Images obtained via a lens are displayed as a camera-through image on the monitor 117 and the viewfinder 116 regardless of whether image capturing has been performed.

An operation section 118 includes the release switch 12, the zoom button 15, the operation button 16 allowing a user to input various operational information, and the mode dial 20 allowing a user to set an image capturing mode, which have been described previously with reference to FIG. 2 and are disposed on a camera body. A control section 110 including a CPU controls various processing operations performed by the image pickup apparatus in accordance with programs stored in a memory 120 such as a ROM. A memory 119 that is a nonvolatile memory such as an EEPROM stores image data, various pieces of supplementary information, programs, etc. The memory 120 stores programs used by the control section 110 and a computation parameter, etc. A memory 121 such as a RAM stores programs used by the control section 110 and a parameter that is changed by executing the programs. A gyro 111 detects the inclination and shake of the image pickup apparatus. The detection result is input into the control section 110, and processing such as camera shake correction is performed therein on the basis of the detection result.

A motor driver 112 drives a focus lens driving motor 113 disposed for the focus lens 101 and a zoom lens driving motor 114 disposed for the zoom lens 102. A vertical driver 107 drives the image pickup device 103 such as a CCD. A timing generator 106 generates control signals used to control processing timings of the image pickup device 103 and the analog signal processing section 104 and controls the processing timings using the generated control signals.

A face detection section 130 receives image data obtained via a lens from a digital signal processing section 108, and analyzes the received image data so as to detect a face area of a person included in the received image data. The detection result is transmitted to the control section 110.

The control section 110 detects the change in size or position of the face area of a person, which is a target subject, on the basis of the transmitted face area detection results, and determines whether there is a possibility of occurrence of the subject shake blur on the basis of the detection result. If the control section 110 determines that there is a possibility of occurrence of the subject shake blur, it performs processing for notifying a user (photographer) of a possibility of occurrence of the subject shake blur. More specifically, the control section 110 displays a warning icon representing that there is a possibility of occurrence of the subject shake blur on the monitor 117 or the viewfinder 116, or outputs an audible alert.

In the following, processing operations performed by an image pickup apparatus according to an embodiment of the present invention will be individually described in detail. In an image pickup apparatus according to an embodiment of the present invention, the face area of a person, which is a target subject, is specified on the basis of data of an image captured by the image pickup apparatus. It is determined whether there is the subject shake blur on the basis of the data of a face image. If it is determined that there is the subject shake blur, a warning is output. That is, the face detection section 130 performs face area detection. Subsequently, the control section 110 determines whether there is a possibility of occurrence of the subject shake blur on the basis of information on the detected face area and outputs a warning on the basis of the determination result. In the following, details of face recognition processing and distance calculation processing and details of subject shake blur occurrence determination processing and warning output processing will be described in this order.

Face Recognition Processing and Distance Calculation Processing

First, processing operations performed by the face detection section 130, that is, a processing operation for specifying a face area of a person on the basis of image data obtained by an image pickup apparatus and a processing operation for calculating a distance on the basis of the specified face area, will be described.

Various face recognition techniques and various face tracking techniques are disclosed. These techniques can be employed in the present invention. For example, the technique disclosed in Japanese Unexamined Patent Application Publication No. 2004-133637 can be employed in which an original image is compared with a template that includes information on the distribution of face luminance levels. More specifically, first, different types of images obtained by reducing the original image are prepared. Each of the different types of images is compared with templates each including information on the distribution of face luminance levels. The distributions of face luminance levels included in the templates are individually obtained when the face is inclined with respect to the X, Y, and Z axes of the three-dimensional rectangular coordinate system. The inclination of the face included in the original image is determined by performing comparison processing using these templates.

When a certain template is compared with one of the size-reduced images while changing the position of the certain template on a two-dimensional surface of the size-reduced image, if a certain area included in the size-reduced image matches the template, it can be determined that the area includes a face image. The size of the face image can be calculated using the reduction ratio of the original image. Furthermore, the angles of rotation about the three orthogonal axes and the yaw, pitch, and roll angles can be obtained from the template used. The distance from the image pickup apparatus and the face is calculated using the size, position, and rotation angle of the face which have been obtained as described previously.

Figure 4:
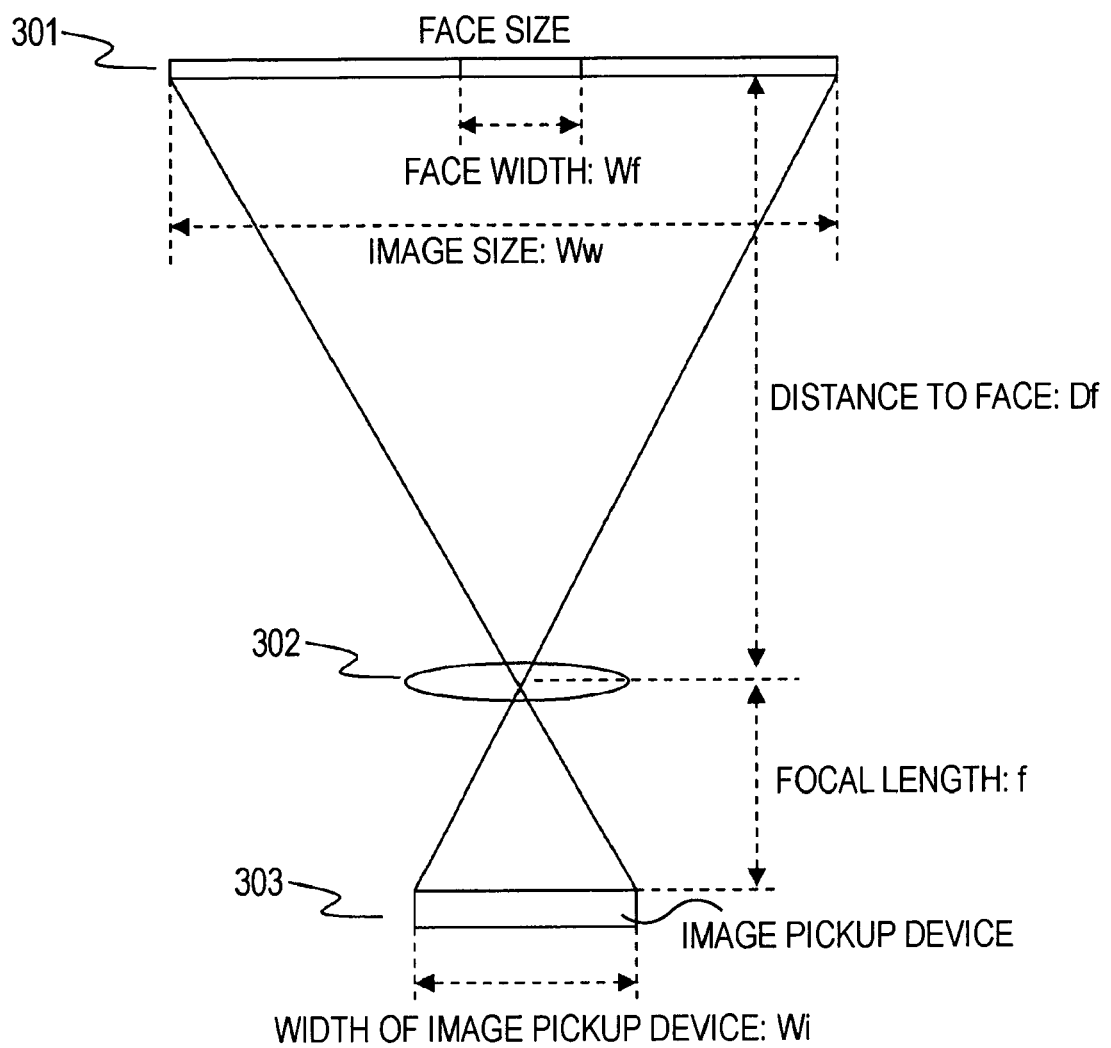
FIG. 4 is a diagram describing subject distance calculation processing performed on the basis of a face size.

The size of a face identified from the obtained image correlates with the distance from the image pickup apparatus to the face, that is, the subject distance. As described previously, the subject distance is calculated on the basis of the size of the identified face, and automatic focusing control can be performed on the basis of the calculated subject distance. In the following, a method of calculating a distance from an image pickup apparatus to a face will be described in detail with reference to FIG. 4. In FIG. 4, a subject position 301, a focus lens 302, and an image pickup device 303 are shown. A person's face is present at the subject position 301. The size (width) of the face is represented by Wf.

If the size of the face (Wf) is obtained, a distance from the lens to the face, that is, the subject distance (Df) from the focus lens 302 to the subject position 301, can be calculated using the following equation based on a basic physical law for lenses $$Df = Wref \times (f/Wi) \times (Ww/Wf) \qquad \text{(equation 1.1)}$$

where Wref denotes a reference value of the size of a human face, Wi denotes the width of an image pickup device, f denotes a focal length, Wf denotes the number of pixels corresponding to the size of a person's face included in a captured image (an image pickup device detection value), and Ww denotes the number of pixels corresponding to the size of an image used for the person's face detection.

The reference value (Wref) of the size of a human face can be set to a predetermined fixed value. The reference value (Wref) of the size of a human face may be set to another value in consideration of individual differences, racial differences, age differences, and sexual differences. As a result, distance estimation can be more accurately performed.

Subject Shake Blur Determination Processing and Warning Output Processing

Next, the subject shake blur determination processing and the warning output processing which are performed by an image pickup apparatus according to an embodiment of the present invention will be described in detail. In an image pickup apparatus according to an embodiment of the present invention, as described previously, the face detection section 130 shown in FIG. 3 identifies a face area included in an image captured by the image pickup apparatus and outputs information on the identified face area to the control section 110. The control section 110 determines a possibility of occurrence of the subject shake blur on the basis of the change in size or position of the identified face area.

Figure 5:
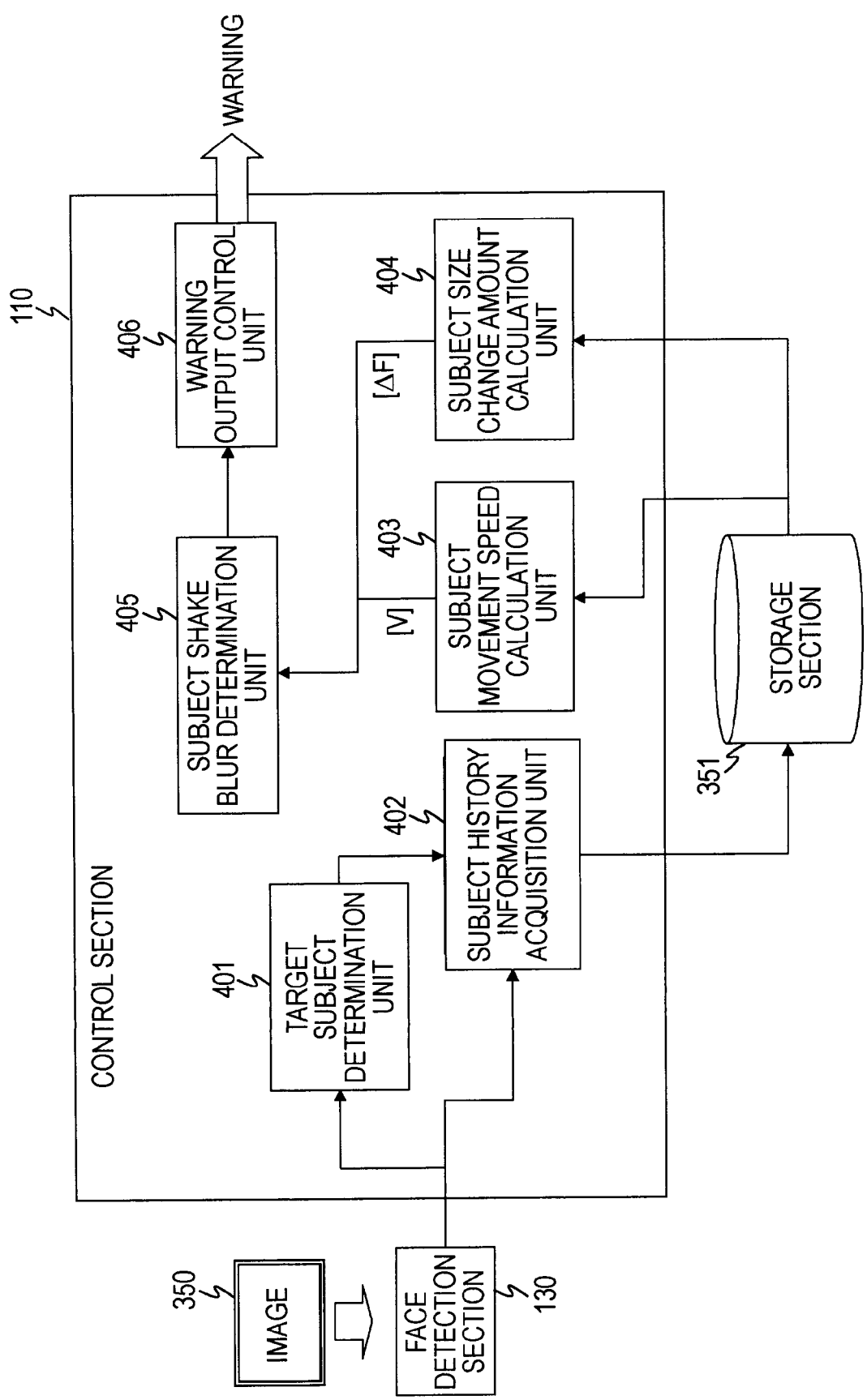
FIG. 5 is a diagram describing a functional configuration of a control section included in an image pickup apparatus according to an embodiment of the present invention.

The functions of the control section and processing operations performed thereby will be described with reference to FIG. 5. As described previously with reference to FIG. 3, the control section 110 includes a CPU, and controls various processing operations performed by the image pickup apparatus in accordance with programs stored in the memory 120 such as a ROM. The configuration of the control section 110 shown in FIG. 5 is not the hardware configuration thereof. FIG. 5 is a functional block diagram describing functions executed by the control section.

As shown in FIG. 5, the control section 110 is provided with the following components as execution functions: a target subject determination unit 401; a subject history information acquisition unit 402; a subject movement speed calculation unit 403; a subject size change amount calculation unit 404; a subject shake blur determination unit 405; and a warning output control unit 406.

As described previously, if the mode dial 20 (shown in FIG. 2) is adjusted to a predetermined position, the face recognition image capturing mode is set in the image pickup apparatus. At that time, an icon representing that the camera is operating in the face recognition image capturing mode is displayed on the monitor 13 and the viewfinder 17, which function as a display section, along with a camera-through image. At the same time, the face detection section 130 (shown in FIG. 3) starts the face area identification processing on the basis of the analysis of an image obtained by the camera.

Subsequent processing will be described with reference to FIG. 5. The face detection section 130 periodically detects an area including a person's face, that is, a face area, from an obtained image 350. The detection information is input into the target subject determination unit 401 and the subject history information acquisition unit 402 which are included in the control section. For example, if a plurality of faces are detected, the target subject determination unit 401 selects one of the detected faces as a target subject. This selection processing is performed in accordance with a predetermined algorithm. For example, the biggest face or a face nearest to the center of the obtained image is selected. If only one face is detected, the face is set as a target subject.

Figure 6:
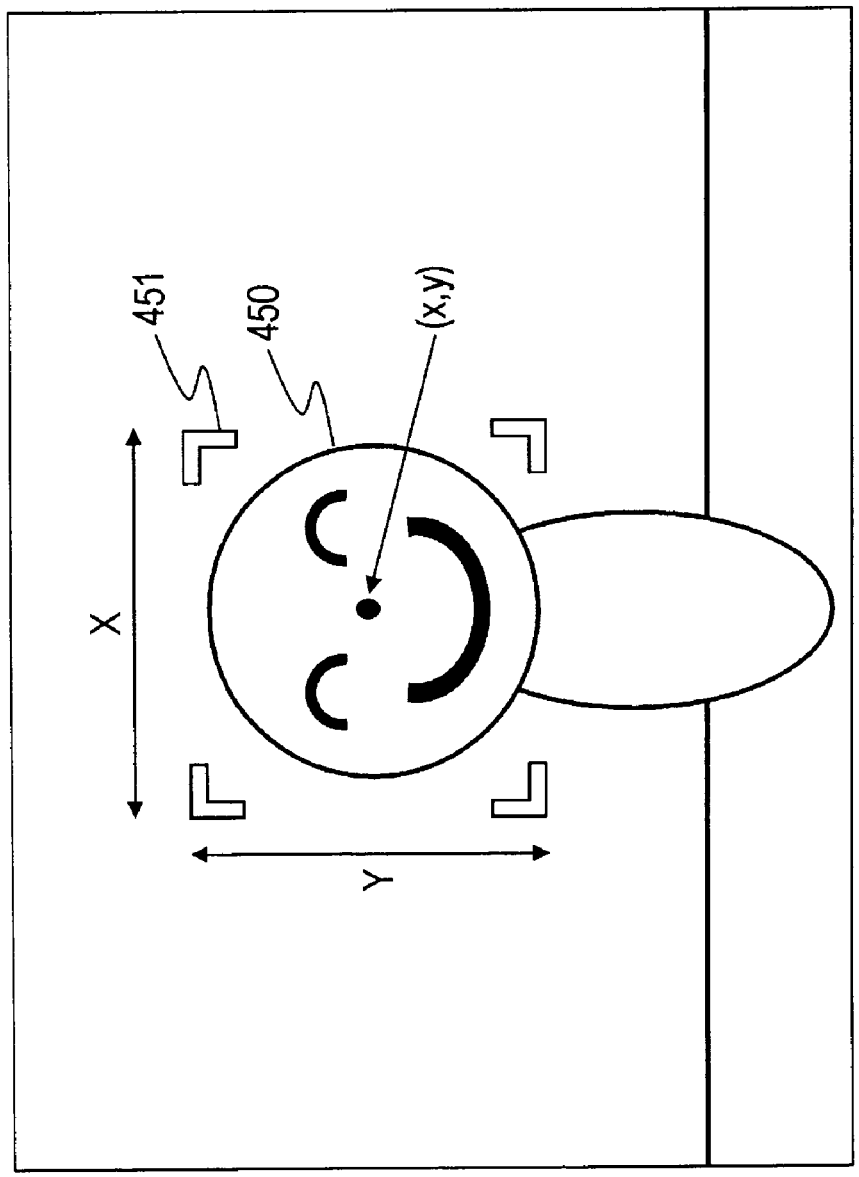
FIG. 6 is a diagram describing a distance measurement frame, information about the size of a subject, and information about the position of the subject.

The control section 110 displays a distance measurement frame around the face area on a liquid crystal panel on the basis of information on the target subject. As shown in FIG. 6, for example, a distance measurement frame 451 is displayed around the face area of a target subject 450 on a monitor or a viewfinder which functions as a display section.

As show in FIG. 5, the face area detection information obtained by the face detection section 130 is also input into the subject history information acquisition unit 402 included in the control section 110. Furthermore, information on the target subject is transmitted from the target subject determination unit 401 to the subject history information acquisition unit 402. The subject history information acquisition unit 402 acquires pieces of information about the position [P] and size [F] of the target subject face area detected by the face detection section 130 on the basis of the received pieces of information, and records the acquired pieces of information in a storage section 351.

The pieces of information acquired by the subject history information acquisition unit 402 will be described with reference to FIGS. 6 and 7. The pieces of information acquired by the subject history information acquisition unit 402 are pieces of information about the position [P] and size [F] of the face area detected by the face detection section 130. As shown in FIG. 6, for example, the information about the position [P] of the face area is information about coordinates (x, y) of the center of the distance measurement frame 451 around the target subject 450. For example, this information can be obtained by using information about a pixel position on the monitor that functions as the display section. Furthermore, as shown in FIG. 6, the information about the size [F] of the face area is information about the width (X) and height (Y) of the distance measurement frame 451 around the target subject 450. For example, this information can be obtained by using information about the number of pixels on the monitor that functions as the display section.

The subject history information acquisition unit 402 sets and displays a distance measurement frame for the face area on the basis of the face area detection information transmitted from the face detection section 130, acquires the pieces of information about the position [P] and size [F] of the face area, and records the acquired pieces of information in the storage section 351. An example of history information recorded in the storage section 351 is shown in FIG. 7.

The subject history information acquisition unit 402 acquires pieces of information about the position [P] and size [F] of the face area at predetermined time intervals, that is, at times t0, t1, t2, . . . as shown in FIG. 7, and records the acquired pieces of information in the storage section 351. For example, an example of history information shown in FIG. 7 includes the following pieces of information.

Time t0: position [P]=(235, 325), size [F]=185×210
Time t1: position [P]=(233, 324), size [F]=184×208
Time t2: position [P]=(220, 320), size [F]=180×205
Time tn: position [P]=(180, 280), size [F]=150×180

The position [P] included in the above-described pieces of information denotes coordinates (x, y) of a pixel position of image data. The size [F] included in the above-described pieces of information denotes the number of pixels [X×Y] corresponding to the width and height of the distance measurement frame.

The subject movement speed calculation unit 403 shown in FIG. 5 acquires the subject history information stored in the storage section 351, calculates the amount of time change in position [P] of the subject, that is, a subject movement speed [V] on the basis of the acquired history information. For example, the subject movement speed [V] is represented by a pixel movement speed [Pixel/sec] of an output image. The subject size change amount calculation unit 404 shown in FIG. 5 acquires the subject history information stored in the storage section 351, and calculates the amount of change [ΔF] in size [F] of the subject for a predetermined periodic measurement period (for example, a sampling period) on the basis of the acquired subject history information. For example, the amount of change [ΔF] in size [F] of the subject is represented by the amount of pixel change [Pixel] of the output image. If the sampling period is not periodic, a speed of change [ΔF'] in size [F] of the subject may be used. The speed of change [ΔF'] is represented by a speed of pixel change [Pixel/sec] of the output image.

In the following, exemplary subject shake blur determination processing performed using the subject movement speed [V] and the amount of change [ΔF] in size [F] of the subject will be described. The subject shake blur determination unit 405 receives information about the subject movement speed [V] calculated by the subject movement speed calculation unit 403 and information about the amount of change [ΔF] in size [F] of the subject calculated by the subject size change amount calculation unit 404, and performs subject shake blur determination processing on the basis of the received pieces of information.

The subject shake blur determination unit 405 performs two types of determination processing operations, that is, a subject shake blur determination processing operation based on the subject movement speed [V] and a subject shake blur determination processing operation based on the amount of change [ΔF] in size [F] of the subject. If the subject shake blur determination unit 405 determines that there is the subject shake blur in at least any one of these determination processing operations, it causes the warning output control unit 406 to output a warning denoting the occurrence of the subject shake blur.

The subject shake blur determination unit 405 performs each of the above-described two types of subject shake blur determination processing operations using information about a shutter speed [S] set for the image pickup apparatus. That is, if an exposure time is short (high-speed shutter), the possibility of occurrence of the subject shake blur becomes low. On the other hand, if an exposure time is long (low-speed shutter), the possibility of occurrence of the subject shake blur becomes high. Accordingly, the above-described determination processing operations are individually performed in consideration of information on the shutter speed [S] set for the image pickup apparatus.

The determination processing operations will be described in detail.

Subject Shake Blur Determination Processing Based on the Subject Movement Speed [V]

The subject shake blur determination processing based on the subject movement speed [V] is performed as follows. The product V·S of the subject movement speed [V] and the shutter speed [S] is compared with a predetermined threshold value [Thr1].

$$V \cdot S > Thr1 \qquad \text{(inequality 1)}$$

Subsequently, it is determined whether the above-described inequality 1 is satisfied.

If the above-described inequality 1 is satisfied, the subject shake blur determination unit 405 determines that the possibility of occurrence of the subject shake blur is high, and causes the warning output control unit 406 to output a warning denoting the occurrence of the subject shake blur. If the above-described inequality 1 is not satisfied, the subject shake blur determination unit 405 determines that the possibility of occurrence of the subject shake blur is low, and does not perform the warning output processing. This subject shake blur determination processing based on the subject movement sped [V] is particularly effective for the case in which a subject moves in a translation direction with respect to a camera, that is, the case in which a subject longitudinally or laterally moves on the image capturing screen of the camera. In this case, the amount of change in distance between the subject and the camera is small.

Subject Shake Blur Determination Processing Based on the Amount of Change [ΔF] in Size [F] of a Subject The subject shake blur determination processing based on the amount of change [ΔF] in size [F] of a subject is performed as follows. The product ΔF·S of the amount of change [ΔF] in size [F] of a subject and the shutter speed [S] is compared with a predetermined threshold value [Thr2].

$$\Delta F \cdot S > Thr2 \quad \text{(inequality 2)}$$

Subsequently, it is determined whether the above-described inequality 2 is satisfied.

If the above-described inequality 2 is satisfied, the subject shake blur determination unit 405 determines that the possibility of occurrence of the subject shake blur is high, and causes the warning output control unit 406 to output a warning denoting the occurrence of the subject shake blur. If the above-described inequality 2 is not satisfied, the subject shake blur determination unit 405 determines that the possibility of occurrence of the subject shake blur is low, and does not perform the warning output processing. This subject shake blur determination processing based on the amount of change [ΔF] in size [F] of a subject is particularly effective for the case in which a subject moved in the depth direction with respect to a camera, that is, the case in which the distance between the camera and the subject is changed.

Thus, the two types of determination processing operations, that is, the subject shake blur determination processing operation based on the subject movement speed [V] and the subject shake blur determination processing operation based on the amount of change [ΔF] in size [F] of a subject, are performed, whereby subject shake blur determination processing operations corresponding to various types of movements of a subject can be performed.

If the subject shake blur determination unit 405 determines that there is the subject shake blur in at least any one of the above-described two types of subject shake blur determination processing operations, it causes the warning output control unit 406 to output a warning denoting the occurrence of the subject shake blur. For example, this warning output processing is performed by displaying an icon on the monitor or viewfinder of the image pickup apparatus.

A display example of an icon is shown in FIG. 8. FIG. 8 shows a display example of the monitor screen of an image pickup apparatus. If the subject shake blur is detected, a subject shake blur warning icon 501 is displayed on the monitor screen along with an image that is being obtained by the image pickup apparatus. If the subject shake blur is compensated for, the warning output control unit 406 deletes the subject shake blur warning icon 501 from the monitor screen.

As described previously, there are two main factors responsible for the occurrence of blur, that is, the camera shake caused by the movement of a camera and the subject shake caused by the movement of a subject. If the same warning icon is displayed for these factors without distinguishing between them, a user (photographer) cannot perform appropriate processing. Accordingly, different warning icons, that is, a subject shake blur warning icon and a camera shake blur warning icon, are output.

More specifically, as shown in FIG. 9, if the subject shake blur is detected, the subject shake blur warning icon 501 is displayed. If the camera shake blur is detected, a camera shake blur warning icon 502 is displayed. Thus, since the different warning icons that allow a user (photographer) to distinguish between factors responsible for the occurrence of blur are displayed, the user (photographer) can respond appropriately without being confused.

For example, if the subject shake blur is compensated for by actions performed by the user, the subject shake blur warning icon 501 is deleted from the display screen. If the camera shake blur is compensated for, the camera shake blur warning icon 502 is deleted from the display screen. Image capturing under the conditions in which no warning icon is displayed can provide an unblurred captured image.

Figure 10:
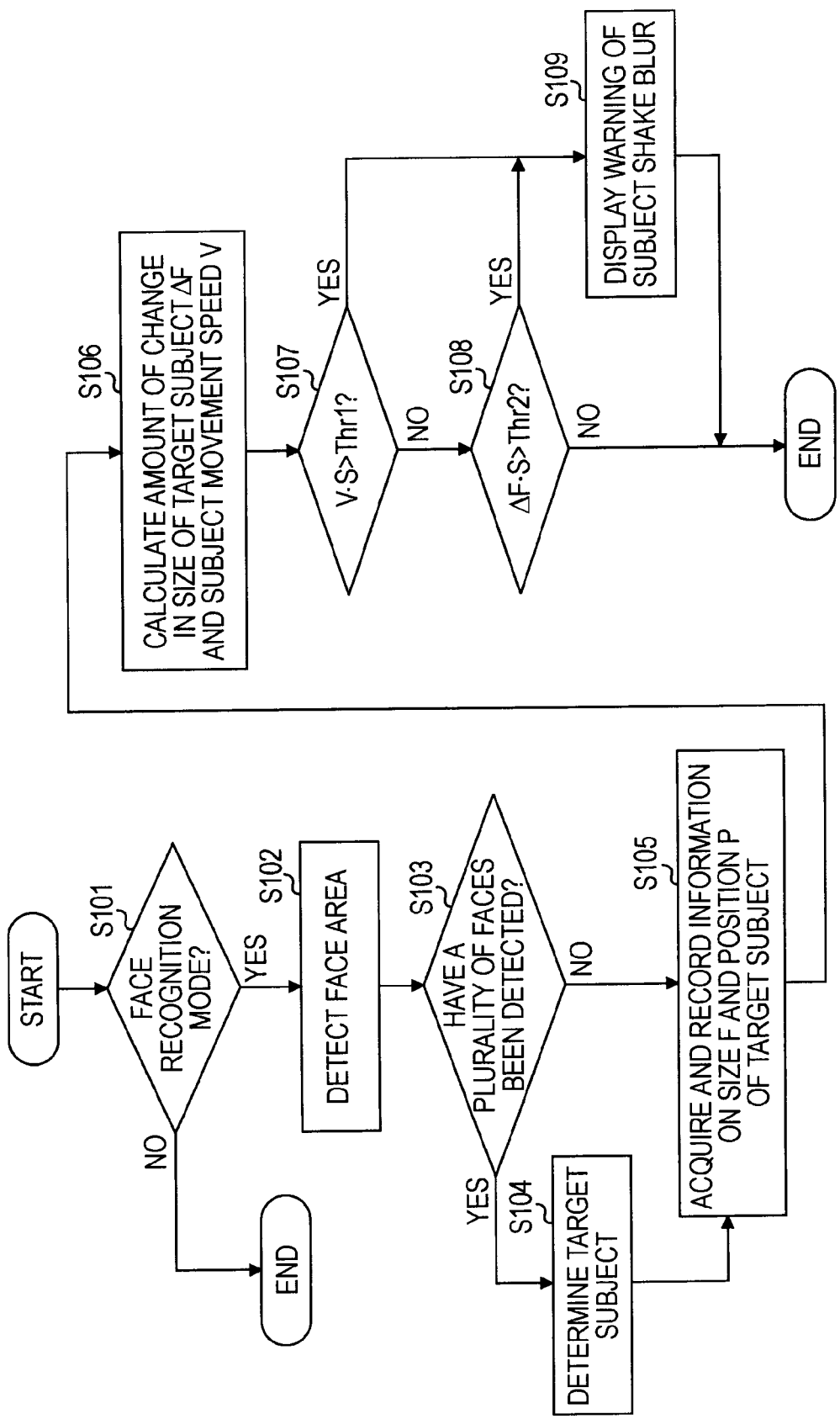
FIG. 10 is a flowchart describing an exemplary processing sequence performed by an image pickup apparatus according to an embodiment of the present invention.

Next, a processing sequence performed by an image pickup apparatus according to an embodiment of the present invention will be described with reference to a flowchart shown in FIG. 10. FIG. 10 is a flowchart showing a processing sequence performed mainly by the control section 110 and the face detection section 130 which are included in the image pickup apparatus shown in FIG. 3.

In step S101, the control section determines whether the face recognition mode has been set. As described previously, the mode dial 20 (shown in FIG. 2) of the image pickup apparatus is adjusted to a predetermined position, the face recognition mode is set in the image pickup apparatus. The control section receives the operation information of this mode dial, and determines whether the face recognition mode has been set on the basis of the received operation information. If the face recognition mode has not been set, the subsequent process from step S102 shown in FIG. 10 will not be performed.

If the face recognition mode has been set, the subsequent process from step S102 will be performed. In step S102, the face detection section 130 (shown in FIG. 3) analyzes an image obtained by the camera so as to detect a face area included in the image. As described previously, for example, this face area detection is performed by comparing the obtained image with a template including information on the distribution of face luminance levels.

In step S103, the target subject determination unit 401 included in the control section performs the processing described previously with reference to FIG. 5. That is, the target subject determination unit 401 determines whether a plurality of face images have been detected from a single image by the face detection section 130. If a plurality of face images have been detected, the process proceeds to step S104 in which a single face image is selected from among the face images as a target subject. For example, the biggest face image or a face image nearest to the center of the image is selected. If only one face image has been detected, the processing of step S104 is not performed and the detected face image is set as a target subject.

Subsequently, in step S105, pieces of information about the size [F] and position [P] of the face area of the target subject are acquired and are then recorded in the storage section. As described previously with reference to FIG. 5, the subject history information acquisition unit 402 acquires pieces of information about the width (X) and height (Y) of the distance measurement frame 451 around the face area of the target subject 450 as the information about the size [F] of the face area of the target subject, and acquires pieces of information about the coordinates (x, y) of the center of the distance measurement frame 451 around the face area of the target subject 450 as the information about the subject position [P] as shown in FIG. 6. The subject history information acquisition unit 402 periodically acquires the above-described pieces of information, and records the acquired pieces of information in the storage section as history information described previously with reference to FIG. 7.

Subsequently, in step S106, the amount of time change in position [P] of the subject, that is, the subject movement speed [V], and the amount of change [ΔF] in size [F] of the subject are calculated.

The above-described calculation processing operations are individually performed by the subject movement speed calculation unit 403 and the subject size change amount calculation unit 404 which are shown in FIG. 5. The subject movement speed calculation unit 403 acquires the subject history information stored in the storage section 351, and calculates the amount of time change in position [P] of the subject, that is, the subject movement speed [V] on the basis of the acquired history information. The subject size change amount calculation unit 404 acquires the subject history information stored in the storage section 351, and calculates the amount of change [ΔF] in size [F] of the subject on the basis of the acquired history information.

Subsequently, in steps S107 and S108, the subject shake blur determination processing operations are performed. The processing operations of steps S107 and S108 are performed by the subject shake blur determination unit 405 shown in FIG. 5. As described previously, the subject shake blur determination processing operations are performed using information about the shutter speed [S] set for the image pickup apparatus. That is, if an exposure time is short (high-speed shutter), the possibility of occurrence of the subject shake blur becomes low. If an exposure time is long (low-speed shutter), the possibility of occurrence of the subject shake blur becomes high. Accordingly, the subject shake blur determination processing is performed in consideration of information about the shutter speed [S] set for the image pickup apparatus.

First, in step S107, the subject shake blur determination processing based on the subject movement speed [V] is performed. The product V·S of the subject movement speed [V] and the shutter speed [S] is compared with the predetermined threshold value [Thr1].

$$V \cdot S > \text{Thr1} \quad \text{(inequality 1)}$$

Subsequently, it is determined whether the above-described inequality 1 is satisfied.

If the above-described inequality 1 is satisfied, it is determined that the possibility of occurrence of the subject shake blur is high. Subsequently, the process proceeds to step S109, the subject shake blur determination unit 405 causes the warning output control unit 406 to output a warning denoting the occurrence of the subject shake blur. For example, as described previously with reference to FIGS. 8 and 9, the subject shake blur warning icon is output to the display section.

If the above-described inequality 1 is not satisfied, the process proceeds to step S108. In step S108, the subject shake blur determination processing based on the amount of change [ΔF] in size [F] of the subject is performed. The product ΔF·S of the amount of change [ΔF] in size [F] of the subject and the shutter speed [S] is compared with the predetermined threshold value [Thr2].

$$\Delta F \cdot S > \text{Thr2} \quad \text{(inequality 2)}$$

Subsequently, it is determined whether the above-described inequality 2 is satisfied.

If the above-described inequality 2 is satisfied, it is determined that the possibility of occurrence of the subject shake blur is high and the process proceeds to step S109 in which the subject shake blur determination unit 405 causes the warning output control unit 406 to output a warning denoting the occurrence of the subject shake blur.

If the above-described inequality 2 is not satisfied, it is determined that there is no possibility of occurrence of the subject shake blur and the process ends. The processing sequence shown in FIG. 10 is continuously and repeatedly performed while the image pickup apparatus is turned on and the camera-through image is obtained.

As described previously, in an image pickup apparatus according to an embodiment of the present invention, it is determined whether there is a possibility of occurrence of blur caused by the movement of a subject which is different from that caused by the movement of a camera. If it is determined that there is a possibility of occurrence of the subject shake blur, a warning is output for a user (photographer). Accordingly, the user (photographer) can know a possibility of occurrence of blur caused by the movement of a subject before performing image capturing, and can prevent a blurred image from being captured by performing appropriate processing.

Furthermore, in an image pickup apparatus according to an embodiment of the present invention, the two types of determination processing operations, that is, the subject shake blur determination processing operation based on the subject movement speed [V] and the subject shake blur determination processing operation based on the amount of change [ΔF] in size [F] of a subject, are performed, whereby subject shake blur determination processing operations corresponding to various types of movements of a subject can be performed.

In the above-described example of processing, if a plurality of face areas are detected from a single image, a single face area is selected from among them as a target subject. The selected target subject is analyzed so as to determine whether there is a possibility of occurrence of the subject shake blur. However, the average value of the subject movement speeds [V] of a plurality of face areas and the average value of the amounts [ΔF] of change in size of a plurality of face areas are calculated, and the subject shake blur determination processing may be performed using the calculated average values. That is, for example, the average value of the sizes of the detected face areas and the average movement speed of the detected face areas are calculated, and the absolute values of these average values are calculated. The subject shake blur determination processing may be performed using the calculated absolute values.

In the above-described example of processing, if it is determined that there is a possibility of occurrence of the subject shake blur, a warning icon is output. However, not only the warning icon but also an audible alert such as beeping sound may be output. Furthermore, processing for forbidding image capturing while there is a possibility of occurrence of the subject shake blur may be performed.

Furthermore, if it is determined that there is a possibility of occurrence of the subject shake blur, control processing for setting a high shutter speed may be performed. Alternatively, control processing for automatically increasing the sensitivity of an imager may be performed so that the risk of occurrence of the subject shake blur can be reduced. The risk of occurrence of the subject shake blur in a captured image can be reduced by performing the above-described control processing.

The above-described control processing operations are performed by the control section. That is, the control section performs one of the following control processing operations or performs them in combination if it is determined that there is a possibility of occurrence of the subject shake blur: control processing for controlling the output of a warning icon or an audible alert; control processing for forbidding an image pickup apparatus to perform image capturing; control processing for changing a shutter speed set for an image pickup apparatus to a high shutter speed; and control processing for increasing an ISO speed at the time of image capturing performed by an image pickup apparatus.

In the above-described embodiments, description has been made on the assumption that the image pickup apparatus is a digital still camera. However, the image pickup apparatus may be a different type of apparatus such as a video camera or a mobile telephone with a camera if the apparatus can capture an image of a person.

The present invention has been described in detail with reference to specific embodiments. However, it is obvious that modifications and substitutions of the embodiments can be made by those skilled in the art without departing from the scope of the present invention. That is, the present invention has been disclosed in conjunction with the embodiments, and the details of this specification should not be restrictively interpreted. The scope of the present invention should be interpreted in consideration of the scope of the appended claims.

The above-described processing flow can be performed by hardware, software, or the combination thereof. If the processing flow is performed by software, a program recording a processing sequence is installed in a memory included in a computer embedded in a piece of dedicated hardware or on a general-purpose computer that is allowed to perform various processing operations by installing various programs thereon.

For example, the program may be recorded on a recording medium such as a hard disk or a ROM (Read-Only Memory) in advance. Alternatively, the program may be temporarily or permanently stored (recorded) on a removal recording medium such as a flexible disk, a CD-ROM (Compact Disc-Read-Only Memory), an MO (Magneto-Optical) disk, a DVD (Digital Versatile Disc), a magnetic disk, or a semiconductor memory. Such a removable recording medium may be obtained as package software.

When the program is installed from the above-described removable recording medium on a computer, the program may be wirelessly transferred from a download site to the computer, or may be transferred to the computer via a wired network such as a LAN (Local Area Network) or the Internet. The computer may receive the transferred program, and install the received program on an internal recording medium such as a hard disk.

Various types of processing operations described in this specification may be executed in chronological order described above. Alternatively, the processing operations may be executed concurrently or individually as appropriate or in accordance with the processing power of an apparatus for executing these processing operations. In this specification, a system means a logical group of a plurality of apparatuses. These apparatuses may not be in the same cabinet.

What is claimed is:

1. An image pickup apparatus, comprising:
    a face detection section configured to detect a face area from an image obtained by the image pickup apparatus; and
    a control section configured to detect an amount of change in size of the face area detected by the face detection section and a movement speed of the face area, determine whether there is a possibility of occurrence of subject shake blur that is blur occurring in a captured image due to the movement of a subject on the basis of information on the detected amount of change in size of the face area or the detected movement speed of the face area, and output a warning when it is determined that there is a possibility of occurrence of subject shake blur.

2. The image pickup apparatus according to claim 1, wherein the control section includes,
    a subject history information acquisition unit configured to continuously receive face area detection results from the face detection section, detect at least any one of the sizes and positions of face areas that are included in the continuously received face area detection results, generate history information using a plurality of pieces of information on the detected sizes or positions of the face areas, and record the generated history information in a storage section,
    a subject size change amount calculation unit configured to calculate the amount of change in size of the face area on the basis of the history information, and
    a subject movement speed calculation unit configured to calculate the movement speed of the face area on the basis of the history information, and
    wherein the control section determines whether there is a possibility of occurrence of subject shake blur on the basis of any one of the amount of change in size of the face area calculated by the subject size change amount calculation unit and the movement speed of the face area calculated by the subject movement speed calculation unit.

3. The image pickup apparatus according to claim 1, wherein the control section compares a product [$\Delta F \cdot S$] of the amount of change [$\Delta F$] in size of the face area detected by the face detection section and a shutter speed [$S$] set for the image pickup apparatus with a predetermined threshold value, and determines that there is a possibility of occurrence of subject shake blur when the product [$\Delta F \cdot S$] is larger than the predetermined threshold value.

4. The image pickup apparatus according to claim 1, wherein the control section compares a product [$V \cdot S$] of the movement speed [$V$] of the face area detected by the face detection section and the shutter speed [$S$] set for the image pickup apparatus with a predetermined threshold value, and determines that there is a possibility of occurrence of subject shake blur when the product [$V \cdot S$] is larger than the predetermined threshold value.

5. The image pickup apparatus according to claim 1, wherein the control section outputs a warning icon to a display section of the image pickup apparatus when it is determined that there is a possibility of occurrence of subject shake blur.

6. The image pickup apparatus according to claim 5, wherein the warning icon output from the control section is a subject shake blur warning icon whose display information is different from that of a warning icon for a camera shake blur caused by the movement of a camera.

7. The image pickup apparatus according to claim 1, wherein the control section performs control processing for forbidding the image pickup apparatus to perform image capturing when it is determined that there is a possibility of occurrence of subject shake blur.

8. The image pickup apparatus according to claim 1, wherein the control section performs control processing for changing a shutter speed set for the image pickup apparatus to a high shutter speed when it is determined that there is a possibility of occurrence of subject shake blur.

9. The image pickup apparatus according to claim 1, wherein the control section performs control processing for increasing an ISO speed at the time of image capturing performed by the image pickup apparatus when it is determined that there is a possibility of occurrence of subject shake blur.

10. An image pickup apparatus control method of performing blur detection processing in an image pickup apparatus, comprising:
   a face detecting step of detecting a face area from an image obtained by the image pickup apparatus; and
   a controlling step of detecting an amount of change in size of the face area detected in the face detecting step and a movement speed of the face area, determining whether there is a possibility of occurrence of subject shake blur that is blur occurring in a captured image due to the movement of a subject on the basis of information on the detected amount of change in size of the face area or the detected movement speed of the face area, and outputting a warning when it is determined that there is a possibility of occurrence of subject shake blur.

11. The image pickup apparatus control method according to claim 10,
   wherein the controlling step includes,
   a subject history information acquiring step of continuously receiving face area detection results obtained in the face detecting step, detecting at least any one of the sizes and positions of face areas that are included in the continuously received face area detection results, generating history information using a plurality of pieces of information on the detected sizes or positions of the face areas, and recording the generated history information in a storage section,
   a subject size change amount calculating step of calculating the amount of change in size of the face area on the basis of the history information, and
   a subject movement speed calculating step of calculating the movement speed of the face area on the basis of the history information,
   wherein, in the controlling step, it is determined whether there is a possibility of occurrence of subject shake blur on the basis of any one of the amount of change in size of the face area calculated in the subject size change amount calculating step and the movement speed of the face area calculated in the subject movement speed calculating step.

12. The image pickup apparatus control method according to claim 10, wherein, in the controlling step, a product [ΔF·S] of the amount of change [ΔF] in size of the face area detected in the face detecting step and a shutter speed [S] set for the image pickup apparatus is compared with a predetermined threshold value, and it is determined that there is a possibility of occurrence of subject shake blur when the product [ΔF·S] is larger than the predetermined threshold value.

13. The image pickup apparatus control method according to claim 10, wherein, in the controlling step, a product [V·S] of the movement speed [V] of the face area detected in the face detecting step and the shutter speed [S] set for the image pickup apparatus is compared with a predetermined threshold value, and it is determined that there is a possibility of occurrence of subject shake blur when the product [V·S] is larger than the predetermined threshold value.

14. The image pickup apparatus control method according to claim 10, wherein the controlling step includes a step of outputting a warning icon to a display section of the image pickup apparatus when it is determined that there is a possibility of occurrence of subject shake blur.

15. The image pickup apparatus control method according to claim 14, wherein the warning icon is a subject shake blur warning icon whose display information is different from that of a warning icon for a camera shake blur caused by the movement of a camera.

16. The image pickup apparatus control method according to claim 10, wherein the controlling step includes a step of performing control processing for forbidding the image pickup apparatus to perform image capturing when it is determined that there is a possibility of occurrence of subject shake blur.

17. The image pickup apparatus control method according to claim 10, wherein the controlling step includes a step of performing control processing for changing a shutter speed set for the image pickup apparatus to a high shutter speed when it is determined that there is a possibility of occurrence of subject shake blur.

18. The image pickup apparatus control method according to claim 10, wherein the controlling step includes a step of performing control processing for increasing an ISO speed at the time of image capturing performed by the image pickup apparatus when it is determined that there is a possibility of occurrence of subject shake blur.

19. A non-transitory computer readable storage medium encoded with a program causing a computer to perform blur detection processing in an image pickup apparatus, the computer program causing the computer to execute a method comprising:
   a face detecting step of detecting a face area from an image obtained by the image pickup apparatus; and
   a controlling step of detecting an amount of change in size of the face area detected in the face detecting step and a movement speed of the face area, determining whether there is a possibility of occurrence of subject shake blur that is blur occurring in a captured image due to the movement of a subject on the basis of information on the detected amount of change in size of the face area or the detected movement speed of the face area, and outputting a warning when it is determined that there is a possibility of occurrence of subject shake blur.

20. An imaging control apparatus, comprising:
   a face detection section configured to detect a face area from an obtained image; and
   a control section configured to detect an amount of change in size of the face area detected by the face detection section and a movement speed of the face area, determine whether there is a possibility of occurrence of subject shake blur that is blur occurring in a captured image due to the movement of a subject on the basis of information on the detected amount of change in size of the face area or the detected movement speed of the face area, and output a warning when it is determined that there is a possibility of occurrence of subject shake blur.

* * * * *